United States Patent [19]

Shively et al.

[11] 4,006,862
[45] Feb. 8, 1977

[54] ARMATURE WINDING APPARATUS WITH IMPROVED ARMATURE LOADING AND UNLOADING MECHANISM

[75] Inventors: Lawrence A. Shively, Dayton; Robert C. Gray, Tipp City; Robert P. Hoy, Springfield, all of Ohio

[73] Assignee: Mechaneer, Inc., Dayton, Ohio

[22] Filed: Dec. 20, 1974

[21] Appl. No.: 534,911

[52] U.S. Cl. .............................. 242/7.05 B; 29/598; 214/1 BD; 242/7.09
[51] Int. Cl.² ................. B65G 29/00; H02K 15/09
[58] Field of Search ................ 242/7.05 R, 7.05 A, 242/7.05 B, 7.05 C, 64, 56 A, 7.09; 214/1 B, 1 BB, 1 BD, 1 BV; 29/205 R, 598

[56] References Cited
UNITED STATES PATENTS

| | | | |
|---|---|---|---|
| 2,861,601 | 11/1958 | Marzolf | 242/7.09 X |
| 2,942,793 | 6/1960 | Moore | 242/7.05 B |
| 2,970,786 | 2/1961 | Justus et al. | 242/64 |
| 3,075,634 | 1/1963 | Schwacofer | 214/1 BD X |
| 3,101,180 | 8/1963 | Sadorf | 242/7.09 |
| 3,136,493 | 6/1964 | Swanson | 242/7.09 |
| 3,161,363 | 12/1964 | Press | 242/64 X |
| 3,332,633 | 7/1967 | Carson | 242/7.09 |
| 3,776,397 | 12/1973 | Hoy et al. | 214/1 BB X |

FOREIGN PATENTS OR APPLICATIONS
636,593  3/1962  Italy .................................. 242/7.09

*Primary Examiner*—Stanley N. Gilreath
*Assistant Examiner*—John M. Jillions
*Attorney, Agent, or Firm*—Jacox & Meckstroth

[57] ABSTRACT

An armature winding machine supports a combined armature loading and unloading mechanism which includes a turret supported by a carriage for rotary indexing movement on a horizontal axis. The carriage is supported for horizontal linear movement by a set of guide rods projecting outwardly from the winding machine, and the carriage and turret are moved between inner and outer positions by actuation of a fluid cylinder. The turret includes a set of annularly arranged gripping members which successively grip the unwound armatures supplied from a vertically moveable magazine located above the turret. While each unwound armature is being transferred to the winding station by the turret, a wound armature is simultaneously transferred by the turret to an unloading station where it is released from its gripping member. The turret automatically indexes in response to linear movement of the carriage.

15 Claims, 4 Drawing Figures

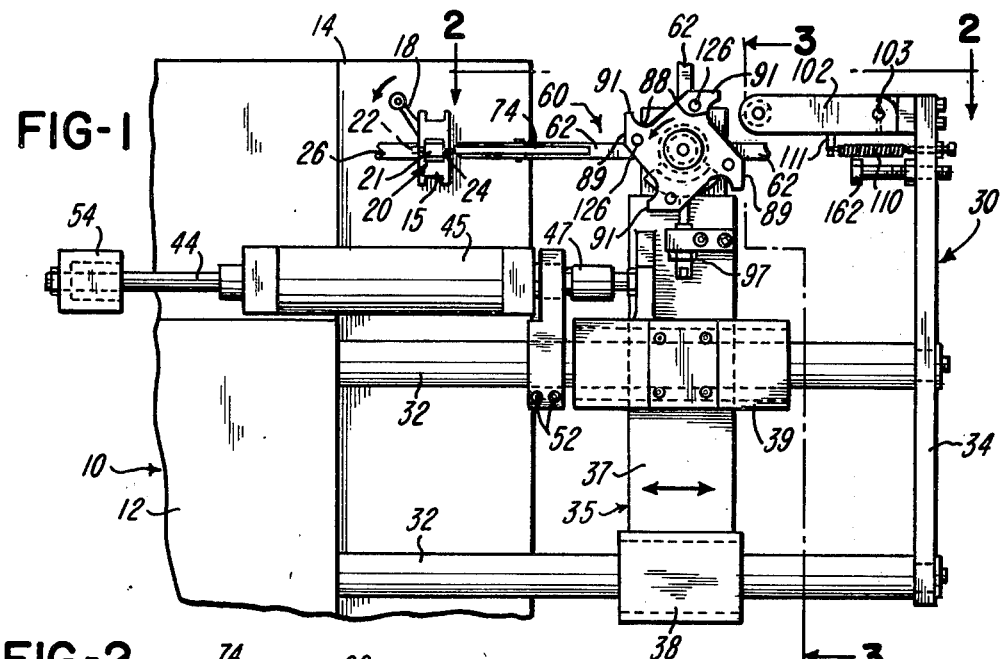

ARMATURE WINDING APPARATUS WITH IMPROVED ARMATURE LOADING AND UNLOADING MECHANISM

BACKGROUND OF THE INVENTION

This invention relates to an armature machine of the general type disclosed in U.S. Pat. Nos. 2,627,379 and 3,103,737 and which is used for automatically winding a succession of armatures each having a slotted armature core and a commutator mounted on a shaft. In association with such a machine, various types of mechanisms have been either used or proposed for successively loading a series of unwound armatures from a supply source to the winding station located between a pair of opposing wire forming heads or chucks. There has also been various mechanisms for unloading each armature from the winding station after the armature core is wound with a predetermined number of wire coils.

For example, U.S. Pat. No. 3,776,397, which issued to the assignee of the present invention, discloses a vertically movable carriage which grips the projecting shaft of each unwound armature and transfers the armature downwardly between the opposing armature chucks after the chucks are retracted to provide sufficient clearance. After each armature is wound, the outwardly projecting end portion of the armature shaft is gripped by an unloading mechanism which retracts the wound armature axially from the winding station and transfers the wound armature to a conveyor or the like.

It is also known to sue an armature shaft gripping mechanism which includes a member adapted to grip each wound armature shaft at the winding station, to retract the armature from the winding station and then swing 180° on a vertical axis to transfer the wound armature to a conveyor or transfer chute. An unwound armature is positioned in line for pick up by the gripping member when it returns 180° to a position aligned axially with the unwound armature.

SUMMARY OF THE INVENTION

The present invention is directed to an armature winding machine incorporating improved automatic loading and unloading mechanism which provides, as one important feature, for significantly reducing the time required for loading an unwound armature into the winding machine and for unloading a wound armature from the machine so that the cycle time for winding an armature is minimized. The mechanism is also adapted to mount directly on the housing of a winding machine either as part of a new machine or as an attachment for an existing machine in the field. In addition, the mechanism of the invention provides for loading an unwound armature into the machine simultaneously with the unloading of a wound armature from the machine, and is capable of loading a plurality of armatures simultaneously so that the mechanism may be used with a machine capable of simultaneously winding a plurality of armatures.

In accordance with one embodiment of the invention, the above features are provided by a mechanism which generally incorporates a turret supported for rotation on a horizontal axis and having a plurality of angularly spaced gripping members positioned to grip the end portions of the armature shafts. The turret is supported by a carriage which mounts on a set of parallel guide rods projecting horizontally outwardly from the bed of the winding machine, and a fluid cylinder is connected to move the carriage horizontally on the guide rods. Means are also provided for automatically indexing the turret in response to linear movement of the carriage.

Unwound armatures are successively fed to the turret by vertical movement of an armature supply magazine system which is located directly above the turret, and each armature is moved axially by the turret to the winding station. After an armature is wound, the aramtrue is retracted axially from the winding station by linear movement of the turret and carriage. The turret is simultaneously indexed while it is being retracted so that the wound armature is transferred to an unloading station where the wound armature is discharged from the turret.

Other features and advantages of the invention will be apparent from the following description, the accompanying drawing and the appended claims.

BRIEF DESCRIPTION OF THE DRAWING

FIG. 1 is an elevational view of a lodaing and unloading mechanism constructed in accordance with the invention, as taken generally on the line 1—1 of FIG. 3, and illustrating its support by an armature winding machine;

FIG. 2 is a fragmentary plan view, in part section taken generally on the line 2—2 of FIG. 1;

FIG. 3 is an elevational section of the mechanism taken generally on the line 3—3 of FIG. 1 and showing its relationship with a device for successively transferring unwound armatures from a supply source to the armature loading mechansim; and FIG. 4 is an elevation view of the armature transfer device, taken generally on the line 4—4 of FIG. 3.

DESCRIPTION OF THE PREFERRED EMBODIMENT

Referring to FIG. 1, an armature winding machine 10 includes a housing having a bed or base portion 12 and a pair of opposing head portions 14 which support a set of opposing wire forming chucks 15. The chucks 15 are horizontally retractable as disclosed in above U.S. Pat. No. 3,776,397, and a wire winding or flier assembly 18 is positioned for rotation adjacent each of the retractable chucks 15. A stationary intermediate forming head (not shown) is positioned between the chucks 15 and cooperates with the chucks to provide for winding two armatures simultaneously.

For purpose of illustration only, FIG. 1 shows a relatively small armature 20 which includes a slotted core 21 and a commutator 22 mounted on a shaft 24 in axially spaced relation. However, it is to be understood that the automatic loading and unloading mechansim of the invention may be easily adapted for handling armature of either larger or smaller sizes and may be used on a machine where only one armature is wound during a winding cycle. The armature winding machine shown in FIG. 1 also includes a tubular or hollow cylindrical shield 26 for receiving the commutator 22 of the corresponding armature, and each shield has a notch for sequentially exposing the wire connecting tangs of the commutator as the armature is indexed between the corresponding chucks.

In accordance with the present invention, an automatic armature loading and unloading mechanism 30 is supported by the base portion 12 of the armature winding machine 10 and includes a pair of outwardly projecting horizontal guide rods 32 which have their inner end portions rigidly secured to the base portion 12 and their outer end portions rigidly connected by an elongated vertical plate 34. A carriage 35 is supported by the guide rods 32 for horizontal linear movement and includes a vertical plate 37 (FIG. 3). The plate 37 is rigidly connected to a set of vertically spaced bearing block members 38 and 39 which confine corresponding antifriction linear bearings 41 mounted on the rods 32.

A reinforcing rib 43 rigidly secures the upper bearing block 39 to the plate 37 and is connected to one end portion of a piston rod 44 (FIG. 1) of a pneumatic or fluid cylinder 45 through a flexible coupling 47. The housing of the fluid cylinder 45 is supported by a bracket 51 which is rigidly secured to the upper guide rod 32 by a set of clamping screws 52. A resilient stop member 54 is secured to the inner or opposite end portion of the piston rod 44 and cooperates with the housing of the cylinder 45 to cushion the movement of the carriage 35 to the right (FIG. 1).

A turrent 60 is supported by the carriage 35 and includes a set of four plate-like members or arms 62 which are secured to a cylindrical hub 63 and are spaced circumferentially at 90° intervals. The hub 63 is secured to a shaft 66 which is supported by a set of antifriction bearing 67 for rotation on a horizontal axis. The bearings 67 are retained by a bearing housing 69 which is rigidly secured to the upper edge of the plate 37 and is reinforced by an angle plate 71.

Each of the four arms 62 of the turret 60 supports a pair of gripping fingers 74 each mounted for pivotal movement on a corresponding pin 76. The outer end portion of each gripping finger 74 has a V-shaped groove which cooperates with a corresponding opposing parallel groove formed within a jaw element 78 to provide for receiving and retaining an end portion of a corresponding armature shaft 24. The inner end portion of each gripping finger 74 is engaged by a corresponding compression spring 81 which is retained within a horizontal bore formed within the support arm 62. Thus the outer end portion of each gripping finger 74 is normally urged against the opposing jaw element 78 for frictionally gripping an armature shaft.

A brake drum 84 (FIG. 3) is secured to the opposite end portion of the shaft 66 along with an indexing member or wheel 86. The indexing member 86 has four uniformly spaced curved recesses 88 each of which extends inwardly from a corresponding outer flat surface 89 so that the indexing wheel has four equally spaced hook-like projections or teeth 91. A part-cylindrical brake shoe 94 (FIGS. 1 and 3) is positioned under the brake drum 84 and is supported by a vertical rod 96 which extends into a bearing housing 97 secured to the plate 37. A compressing spring 98 extends between the housing 97 and the brake shoe 94 and normally urges the brake shoe upwardly into friction enggement with the brake drum 84 for frictionally retaining the shaft 66 and the turret 60 and thereby prevent undesirable rotational movement of the turret 60.

An indexing member or finger 102 (FIGS. 1 and 2) is pivotally supported by a pin 103 which extends through a support bracket 104 secured to the upper end portion of the end plate 34. A roller 106 is mounted on the outer end portion of the finger 102 and is positioned in the horizontal path of the indexing wheel 86. A tension spring 110 (FIG. 1) has one end connected to an adjustable screw secured to the plate 34 and its other end connected to a stud 111 projecting downwardly from the finger 102 for biasing the finger downwardly to its normal horizontal position shown in FIGS. 1 and 2.

Referring to FIG. 3, a plate-like member or bracket 114 is secured to the upper bearing retaining block 39 by a set of screws 116 and supports a fluid cylinder 118. The bracket 114 also supports an L-shaped guide member 119 which projects upwardly adjacent the indexing wheel 86. The fluid cylinder 118 includes a piston rod 122 which has an inner end portion supporting a lock pin 124 adapted to be received within one of four mating holes 126 formed within the indexing wheel 86 for precisely positioning or locating the wheel 86 and the turret 60.

A plurality of two unwound armatures 20 are simultaneously supplied to the turret 60 by an armature transfer or supply mechanism 130 shown in FIGS. 3 and 4. This mechanism 130 includes a set of two vertical tubular magazines 132 which are positioned directly above the turret 60 with corresponding axes disposed in a vertical plane extending through the horizontal axis of the turret 60 when the turret is in its loading position shown in FIG. 1. Each of the magazines 132 is adapted to receive a stack of armatures with the commutator end portion of each armature on top, as illustrated in FIG. 3. The magazines are rigidly secured to a horizontal carriage member or support plate 134 which projects horizontally from a pair of housings 136 which retain linear antifriction bearings mounted for a vertical movement on a pair of spaced vertical guide rods 138. The lower end portions of the guide rods 138 are rigidly supported by a base plate 141 which is secured to the upper surface of the adjacent head portion 114 of the armature winding machine 10. The upper end portions of the guide rods 138 are rigidly connected by a block or tie member 142.

The magazines 132 and their support plate 134 are adapted to be moved vertically on the guide rods 138 and relative to the turret 60 by actuation of a fluid cylinder 146 (FIG. 4) which has a piston rod 147 connected to the plate 134 by a flexible coupling 149. As shown in FIG. 3, a pair of parallel brackets 152 depend from the outer projecting end portion of the plate 134 adjacent the tubular magazines 132, and each bracket 152 supports a pair of upper and lower fluid actuated cylinders 154. Each pair of vertically arranged cylinders 154 have corresponding inwardly projecting piston rods or pins 156 which are spaced vertically by a distance corresponding substantially to the axial length or stack height of the armature core 21.

In operation of the apparatus described above, a supply of unwound armatures are fed into the vertical magazines 132, for example, by a vibratory feeder, and the piston pins of the opposing sets of cylinders 154 are extended to provide for retaining the lowermost armature within each magazine. The two lowermost armatures within the magazines 132 are transferred to the corresponding opposing arm 62 of the turret 60 by lowering the magazines 132 and the support plate 134 in response to actuation of the fluid cylinder 146. The depending shafts of the two lowermost armatures, are pressed into the corresponding mating grooves defined within the fingers 74 and jaw elements 78 and are frictionally retained by the spring loaded gripping fingers 74

As the shafts of the armatures are being gripped, the lowermost cylinders 154 are actuated to retract the corresponding piston pins 156, after which the magazines 132 and the supply stack of armatures are elevated by again actuating the cylinder 146. The cylinders 154 are each actuated in a sequential escapement-like manner so that the next lowermost unwound armature within each magazine is shifted to the loading position shown in FIG. 3.

After a set of unwound armatures are transferred to the upwardly projecting gripping fingers 74 of the turret 60, the carriage 35 and the turret 60 are shifted to the right (FIG. 1) by actuation of the cylinder 45. When the indexing wheel 86 engages the roller 106 on the indexing finger 102, the indexing wheel 86 and the turret 60 are rotated or indexed precisely 90°. When one of the outer surfaces 89 of the indexing wheel 86 engages the head of an adjustable stop bolt or screw 162 secured to the upper end portion of the plate 34 adjacent the bracket 104, the carriage 35 stops. The turret 60 is locked in its indexed position by actuation of the cylinder 118 which extends the locating pin 124 into the lowermost hole 126 within the indexing wheel 86.

While the winding chucks 15 of the armature winding machine 10 are retracted, the cylinder 45 is actuated to shift the carriage 35 and the turret 60 to the left (FIG. 1). The two parallel spaced unwound armatures 20 are thereby shifted horizontally and axially into corresponding winding stations between the set of chucks 15, as shown in FIG. 1. When the armatures are shifted axially inwardly, the commutators 22 move into the corresponding tubular sleeves 26. The winding operation then commences, and the two armatures are automatically and simultaneously wound.

After the armatures are wound at the winding stations, the cores 21 are released by the chucks 15, and the lock pin 124 is retracted from the indexing wheel 86. The cylinder 145 is again actuated to shift the carrige 35 and the turret 60 to the right (FIG. 1). When the indexing wheel 86 again engages the roller 106 on the indexing finger 102, the turret 60 is again indexed precisely 90° so that another set of unwound armatures 20, which are transferred to the turret 60 during the winding operation, are moved into position for being loaded into the armature winding machine 10. As apparent from FIG. 3, the indexing of the turret 60 is effective to transfer the wound armatures to positions where they depend from the bottom of the turret 60. In this position, the wound armatures are unloaded by actuation of a corresponding pair of solenoids 164 which pivot the gripping finger 74 against the bias of the springs 81 so that the wound armatures are released and drop onto a conveyor or transfer chute 165. The cycle is then repeated.

It is apparent from the drawing and the above description that a winding machine or apparatus incorporating a loading and unloading mechanism constructed in accordance with the invention, provides desirable features and advantages. For example, the mechanism is capable of high speed operation so that unwound armatures are rapidly loaded into the machine and wound armatures are rapidly unloaded from the machine for obtaining maximum production. For example, it has been found that the mechanism of the invention is capable of simultaneously loading and unloading armatures within a time period of less than two seconds. This is less than half of the time period required for loading and unloading armatures with the machanism disclosed in above U.S. Pat. No. 3,776,397 which issued to the assignee of the present invention.

More specifically, while one set of armatures are being wound by the winding machine 10, a set of unwound armatures are simultaneously loaded into the turret 60. As soon as the winding operation is completed and the chucks 15 are retracted, the turret 60 is retracted and indexed by actuation of the cylinder 45. Thus as the wound armatures are being transferred from the winding machine, the unwound armatures are simultaneously being transferred to the winding stations.

While the loading and unloading mechanism has been disclosed in connection with handling two armatures simultaneously at the loading, winding and unloading stations, it is apparent that the mechanism may be used with only one armature at each station or may be constructed to handle more than two armatures at each stations, assuming that the winding machine is constructed for automatically winding more than two armatures simultaneously. Furthermore, while FIG. 3 illustrates the release and discharging of wound armatures onto a chute 165, wound armatures may be discharged onto other forms of conveyors and may be released either at the bottom or six o'clock station of the turret 60 or at the three o'clock station opposite the winding station. At the latter station, the wound armatures may also be presented for a secondary opertions such as a welding or hot staking operation of the tangs which connect the leads to the commutator.

While the form of apparatus herein described constitutes a preferred embodiment of the invention, it is be understood that the invention is not limited to the precise form of apparatus, and that changes may be made therein without departing from the scope and spirit of the invention as defined in the appended claims.

The invention having thus been described, the following is claimed:

1. Apparatus for successively winding armatures each having an armature core and a commutator mounted on an armature shaft, comprising a set of opposing chucks positioned at an armature winding station and having means for gripping the core of each armature, means including a rotatable flyer for winding wire coils on said armature core at said winding station, a turret having a plurality of angularly disposed armature shaft gripping members, means supporting said turret for rotary indexing on a generally horizontal axis in a step-by-step manner, each of said shaft gripping members having means for releasably gripping an end portion of each armature shaft with the armature projecting in a cantilever manner outwardly from said gripping member, means for moving said turret for successively transferring each said gripping member and the corresponding armature from an armature receiving station to a circumferentially spaced armature unloading station through said armature winding station, means for successively supplying unwound armatures and their corresponding shafts to said shaft gripping members at said receiving staton, and means for successively removing the armature shafts of wound armatures from sad gripping members at said unloading station.

2. Apparatus as defined in claim 1 wherein said means for supporting said turret comprise a carriage, and means supporting said carriage for substantially linear movement between an extended position adjacent said winding meas to provide for inserting each armature into said winding means and a retracted position to provide for indexing said turret with armatures being carried by said gripping members.

3. Apparatus as defined in claim 2 including means for automatically indexing said turret in response to movement of said carriage from said extended position to said retracted position.

4. Apparatus as defined in claim 1 wherein said means for supporting said turret comprises a carriage, and means supporting said carriage for generally horizontal linear movement relative to said winding means for presenting each unwound armature to said winding means and for removing the armature from said winding means after the armature is wound.

5. Apparatus as defined in claim 4 including means for automatically indexing said turret in response to movement of said carriage from said extended position to said retracted position.

6. Apparatus as defined in claim 4 wherein said means supporting said carriage comprise a plurality of parallel spaced guide members supported by said winding apparatus and projecting outwardly therefrom.

7. Apparatus as defined in claim 1 wherein said means for supplying unwound armatures to said gripping members of said turret, comprise means for supporting a plurality of unwound armatures in axially aligned relation, and means for moving said armature supporting means generally radially relative to said turret for successively transferring armatures from said armature supporting means to said gripping members of said turret.

8. Apparatus as defined in claim 7 wherein said means for moving said armature supporting means comprise a carriage, means supporting said carriage for generally vertical movement, and fluid cylinder means for moving said carriage.

9. Apparatus as defined in claim 1 wherein said means supporting said turret comprise a carriage, means supporting said carriage for linear movement relative to said winding means, and said means for moving said turret, comprise means for indexing said turret simultaneously with movement of said carriage.

10. Apparatus as defined in claim 9 wherein said means for indexing said turret comprise an indexing wheel connected to rotate with said turret, and a movable pawl member supported to engage said indexing wheel for indexing said turret in response to linear movement of said carriage.

11. Apparatus as defined in claim 10 including an adjustable stop member disposed for engaging said indexing wheel for precisely limiting the linear movement of said carraige and said turret.

12. In armature winding apparatus including means for winding wire coils on an unwound armature including an armature core mounted on an armature shaft, an improved mechanism for successively loading unwound armatures into the armature winding means and for simultaneously unloading wound armatures from said winding means, said mechanism comprising a turret having a plurality of angularly arranged gripping members each adapted to grip the shaft of an armature, a carriage supporting said turret for rotaty indexing movement, means for indexing said turret in a step-by-step manner for successively transferring each gripping member from an armature receiving station to a circumferentially spaced armature unloading station through an armature winding station adjacent said winding means, means for successively supplying armatures to said gripping members at said armature receiving staton, means supporting said carriage for movement of said turret between an extended position adjacent said winding means to provide for inserting each armature axially into said winding means and a retracted position for indexing said turret with armatures being carried by said gripping members, and means for successively removing wound armatures from said gripping members at said aramture unloading station.

13. Apparatus as defined in claim 12 wherein said means for supplying armatures comprising at least one armature supply magazine positioned above said turret and adapted to support a plurality of unwound armatures in axially aligned relation, means for moving said magazine generally vertically relative to said turret, and escapement means for successively releasing the unwound armatures from said magazine for transfer to said turret.

14. Apparatus as defined in claim 13 wherein said escapement means comprise a plurality of parallel arranged fluid cylinders.

15. Apparatus as defined in claim 12 wherein said turret is positioned for said rotary indexing movement on a substantially horizontal axis, and said carriage is supported for generally horizontal linear movement relative to said winding means.

* * * * *